Figure 1:
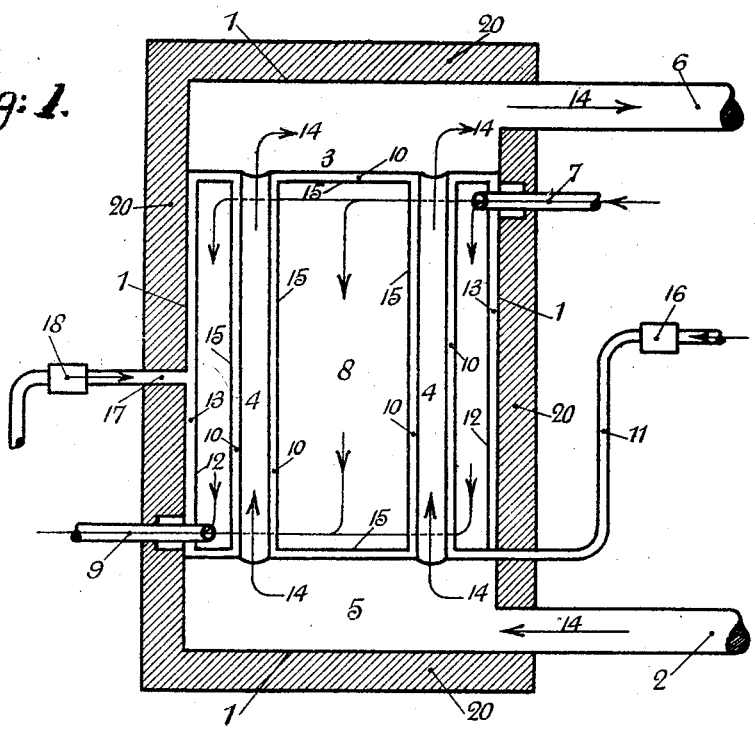

Oct. 6, 1925.                                                                      1,556,135
J. VAN DER HOEVEN
METHOD AND APPARATUS FOR PREVENTING SUBSTANCES FROM MIXING
Filed May 19, 1923

Witnesses
W. G. Jzeren.

Inventor
Jan van der Hoeven.
by [signature]
his Attorney

Patented Oct. 6, 1925.

1,556,135

UNITED STATES PATENT OFFICE.

JAN VAN DER HOEVEN, OF LEIDEN, NETHERLANDS.

METHOD AND APPARATUS FOR PREVENTING SUBSTANCES FROM MIXING.

Application filed May 19, 1923. Serial No. 640,281.

*To all whom it may concern:*

Be it known that I, JAN VAN DER HOEVEN, a subject of the Queen of the Netherlands, residing at Leiden, in the Kingdom of the Netherlands, Rapenburg 100, have invented certain new and useful Improvements in Methods and Apparatus for Preventing Substances from Mixing, of which the following is a specification.

This invention relates to a method and apparatus for preventing the mixing of substances more particularly on the breaking down of the separating partition, and for indicating in conjunction with a suitable f. i. inert substance maintained at a given temperature at a substantially constant pressure, the alteration of said pressure.

Cases frequently arise in the chemical industry, in which work is carried out, with any combination of one or more substances such as solid liquids and gases, as f. i.

(a) Solid bodies and liquids, or
(b) Solid bodies and gases, or
(c) Two or more liquids, or
(d) Two or more gases, or
(e) Simultaneously with two or more liquids and gases, which are divided by a fixed partition, and which if they come in contact with one another through the leakage of the partitions, cause deleterious effects such as explosions.

Explosions having very serious consequences have among others in recent years taken place in the manufacture of nitric acid, the causes of which explosions are to be ascribed to the actions which have developed in the coolers.

As is well known, these latter consist of wrought iron tubes surrounded by a casing. In the manufacture of nitric acid toluene at about $-70°$ C. is passed through these cooling pipes where nitrogen peroxide in a solid form is caused to deposit in the casing surrounding the tubes, whereafter the peroxide is converted into a fluid condition by means of tepid toluene.

In consequence there is a considerable danger of the cooling pipes being rapidly attacked and eaten through, so that the nitrogen peroxide and toluene come into undesired contact with one another and become mixed.

Even the outer casing surrounding the cooler may be attacked and become leaky and in consequence the insulating casing which is preferably made of cork, may be set on fire. In order to avoid this danger of combustion diatomaceous earth in now employed in practice instead of cork.

The application of my said invention is however, not limited to the manufacture of nitric acid exclusively, but the same may be used also in connection with other industries, where the same method and the same means are likely to realize the same result.

One of the features of my invention resides in the method and in the means of separating such bodies (liquids or gases) from each other, by the mixing of which, or by the touching of which bodies with each other, explosions or other deleterious effects may be caused, the said separation being produced by such liquids or such gases, which with the bodies (liquids or gases) to be separated, and at the temperatures used during the operation, do not form chemical combinations, or which under the conditions set forth exercise neutral reaction, or produce actions as harmless as possible under the given conditions.

A second feature of my invention consists therein that the body (liquid or gas) used for separation during the working of the process is kept at a pressure which is either higher or lower than the pressure of the liquids or gases to be separated.

A third feature of my invention consists in the use of mechanical means for the automatic indication of variations in the pressure in the separating body (liquid, gas). This may be attained either by producing with the aid of said mechanical means audible or visible signals, or by causing said mechanical means to actuate automatic closing or switching or reversing devices for stopping the working or to prevent in any other way said deleterious effects or dangers.

In practice I provide a substance neutral to the possible extent, between the substances to be separated, so that on the break-down of the mechanical separating means, contact between the two substances is prevented and indication automatically given of said breakdown.

The choice of the liquids or gases which are to be employed as separating media and the special conditions of their employment must be adapted to the various technical operations and the particular cases.

As separating liquid, such substances or a mixture of them are preferably employed which at the highest temperatures employed in the operation have such a vapour pressure that they do not boil at the working pressure and the melting point of which is lower than the lowest temperatures employed in the operation, in which the use of protective means is necessary or desirable.

In the manufacture of nitric acid, for example, the use of chlorides of the carbon series (for example $SiCl_4$) is advisable as separating media.

In combination or mixture with other separating liquids which in this connection I may term as "main-protecting liquid," chloroform may also be used; I may further use f. i. methyl-benzole, alcohol, i-amyl-alcohol, toluene, methyl-aniline, tetrafluorid of selenium, and other bodies.

As mechanical means the ordinary pressure valves may be employed, which may be connected if desired with electrical signalling devices or caused to work in conjunction therewith.

In carrying out my invention in practice, the substances to be separated from one another are divided by a space or vessel which is formed for example, with double or multiple concentric walls. One of the substances to be separated is located outside and the other inside this separating chamber.

The separating chamber formed by the concentric walls is charged with a substance which serves as separating material (liquid or gas).

The action of the device is that when the walls forming the said separating chamber have been attacked, the liquids which are separated from one another, can not in the first place come into contact with one another, and secondly, because of the altered conditions in the separating chamber, suitable protective means, (for example a warning signal released by a pressure valve), may be made automatically to function.

The separating medium (liquid, gas) may be employed under several conditions, firstly as a means for ascertaining and indicating a leak which has occurred in the separating partitions without the necessity of reestablishing the original pressure. In another case however, the separating medium is employed under the condition that the pressure is maintained constant, f. i. by a pump, that is to say after an alteration of pressure f. i. due to leakage or the like, has taken place, the pressure is re-established and is always kept constant. It may further be employed in such a way that leakages which have arisen are indicated by the accelerated action of the pumps.

In the latter case an automatically acting pump is connected with the separating chamber which can be thrown into and out of action by a pressure valve, on which the more or less accelerated action of the pump is dependent, and whereby the normal pressure is re-established.

The occurrence of leakages according to this invention may generally be indicated by alterations in the pressure or level of the separating media or by alterations in its physical or chemical properties, such for instance as a change of colour, specific gravity, electrical conductivity or the like.

The indication of a leak by the alteration of the colour or of the physical properties of the separating medium can take place by the selection as such medium of a substance which produces, with one or all of the substances to be separated, changes of colour or other alterations of the physical condition in the said medium.

If for example nitrogen peroxide ($NO_2$) is being considered, this is deposited as is well known, in the form of frost on the tubes of the cooler. In order to again thaw the frost or to produce other reactions required by the operation, heated gas or steam or suitably heated liquids or a mixture of these substances may be employed.

These heating bodies may preferably be conducted through pipes which, for example are arranged between the inner and outer walls of the apparatus.

These heating bodies may also be allowed to flow without the provision of pipes between the inner and outer walls of the apparatus. The waste heat of the operation may also be employed for heating purposes.

The invention is illustrated in one example of construction in the accompanying drawings, as applied to the manufacture of nitric acid. Here nitrogen peroxide on the one hand and toluene or benzine on the other are employed as the substances which are to be separated from one another. As a separating medium silicon tetrachloride for example is employed. Less neutral substances, such for example as ethylbenzene, chloroform and the like may be employed as separating media.

The mechanical means for keeping these two liquids separated from one another consists in the use of a multiple partition which are placed around the pipes through which the toluene flows.

Figure 2:
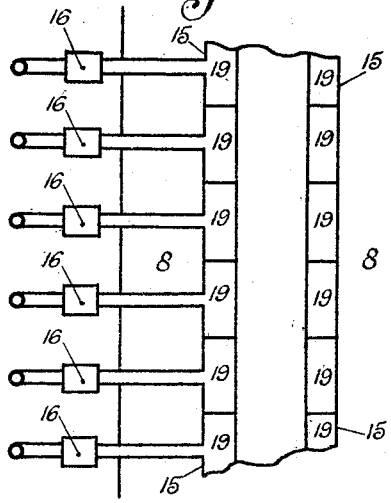

Fig. 1 is a vertical section of the device.
Fig. 2 is a modified form of construction.

1 is the wall of a cooler which is covered with cork or diatomaceous earth 20. 2 is a pipe for introducing toluene into the interior 5 of the cooler.

The toluene flows from the chamber 5 in the direction indicated by the arrows 14 through the pipes 4 and is carried off from the chamber 3 through the pipe 6.

The nitrogen peroxide is introduced into the cooler through the pipe 7 to the chamber 8. The nitrogen-oxygen mixture which has been purified from $NO_2$, is conveyed through the pipe 9. It may also be observed that the substances can be carried in opposite directions to each other in counter-current.

A double wall 15 divides the chambers 3, 4 and 5 from the chamber 8. The chambers 10 thus formed are now filled with a liquid or gas which cannot act chemically on the other two substances, and is selected in such a way that it is adapted as regards its physical properties (melting point, boiling point) to the temperatures and other conditions which arise in the operation.

The width of the chamber between the outer walls is suitably selected to correspond to the working condition. For example in operating with nitrogen peroxide and toluene this distance is made as small as possible in order to obtain an efficient exchange of heat between the toluene and the peroxide. This may be increased by causing the separating fluid to flow in a continuous circulation through the separating chamber 10.

In accordance with the principle of the invention wherein alterations of pressure which arise are utilized for indicating leakages which may occur in the tubular pipes 4, the pressure of the separating substances (for example $SiCl_4$) is kept higher or lower than that of the two substances to be separated (nitrogen peroxide and toluene).

A pipe 11 is connected to the chamber 10, in which pipe a pressure valve 16 or similar device is provided which on an alteration of pressure is adapted to operate an alarm device or an automatically actuated closing device connected with this valve in order to bring the operation to a standstill or otherwise influence it.

The method of operation in the present example of construction is as follows:

If through any reason, for example through one of the walls of the chamber 4 or 15 or both cracking or being eaten through one or both of the substances to be separated comes in contact with the separating liquid, an alteration of pressure takes place in the chambers 10 and 11 and the valve 16 is operated. In order to protect also the walls of the cooler in such cases an inner (double) wall 12 is also provided at the place where the chambers 8 and 20 come in contact, which wall forms with the walls of the cooler a chamber 13 which is filled with compressed air.

A pressure valve 18 is further provided in the feed pipe 17 for the compressed air which valve is actuated when the pressure sinks in the chamber 13.

Should the walls 12 of the cooler crack or be eaten through, an auxiliary arrangement is operated by the lowering of the pressure arising from the escape of the compressed air, which apparatus either releases alarm signals or other automatically acting safety devices. The compressed air has also the effect of preventing the penetration of $NO_2$ into the chamber 12.

Instead of continuous safety chambers 10 divided safety chambers may be provided, in which case the chamber to be protected may be divided in its entire height into separate chambers 19, Fig. 2, separated from one another, but having a valve 16 connected with each one of these chambers, which valve is also connected with a safety device.

I declare that what I claim is:—

1. A method of preventing the mixing of undesired substances on the breaking down of a separating partition consisting of introducing into the space between the double separating partition a separating substance neutral to the possible extent, having a pressure different from those of said substances to be separated and providing a device operated by pressure differences in connection with said separating substance to indicate any alteration of pressure therein.

2. A method of preventing the mixing of undesired substances on the breaking down of a separating partition consisting of introducing a separating medium neutral to the possible extent between said substances to be separated, said medium being under a pressure different from those of said substances, said medium producing by contact with one or more of said substances, an alteration of the conditions of the said medium, and providing means to indicate said altered condition.

3. A method of preventing the mixing of undesired substances on the breaking down of a separating partition consisting of introducing a separating medium neutral to the possible extent between said substances to be separated, said medium being under a pressure different from those of said substances, said medium producing by contact with one or more of said substances, an alteration of the physical conditions of the said medium, and providing means to indicate said altered condition.

4. A method of preventing the mixing of undesired substances on the breaking down of a separating partition consisting of introducing a separating medium neutral to the possible extent between said substances to be separated, said medium being under a pressure different from those of said substances, said medium producing by contact with one or more of said substances, an alteration of the chemical conditions of the said medium, and providing means to indicate said altered condition.

5. A method of preventing the mixing of undesired substances on the breaking down of a separating partition consisting of introducing a separating fluid neutral to the possible extent, between said substances to be separated, said fluid being under a pressure different from those of said substances, said separating fluid being maintained at a substantially constant pressure connecting said fluid with a warning device operated by pressure differences and connecting said device with means to stop the supply of said substances to be separated.

6. A method of preventing the mixing of undesired substances on the breaking down of a separating partition consisting of introducing a separating fluid neutral to the possible extent, between said substances to be separated, said fluid being under a pressure different from those of said substances, said fluid being maintained at a substantially constant pressure, circulating said fluid constantly and connecting said fluid with an indicating device operated by pressure differences.

7. A method of preventing the mixing of undesired substances on the breaking down of a separating partition consisting of introducing a separating medium between said substances to be separated, said medium being under a pressure different from those of said substances, said medium producing by contact with one or more of said substances, an alteration of the conditions of the said medium, circulating said medium constantly, and providing means to indicate said altered condition.

8. A method of preventing the mixing of undesired substances on the breaking down of a separating partition consisting of providing a partition having multiple walls between said substances, introducing a neutral separating substance between the said walls, said separating substance being at a pressure different from those of said substances to be separated, and connecting said separating substances with a device operated by variation in pressure and forming an indicating means.

9. A method of preventing the mixing of undesired substances on the breaking down of a separating partition consisting of introducing a neutral separating fluid between said substances to be separated, said separating fluid being maintained at a substantially constant pressure, which is however different from those of the substances to be separated, said substances having at the highest temperature employed in the operation, such a vapour pressure that it does not boil at the working pressure and a melting point lower than the lowest temperatures employed in the operation.

10. A method of preventing the mixing of undesired substances on the breaking down of a separating partition in the production of nitric acid consisting of providing a partition having multiple walls between said substances, introducing a chloride of the carbon series as separating medium within said partitions, said chloride being at a pressure different from those of said substances to be separated, and connecting said chloride with a device operated by pressure differences.

11. A method of preventing the mixing of undesired substances on the breaking down of a separating partition in the production of nitric acid consisting of providing a partition having multiple walls between said substances introducing silicon tetra-chloride as separating medium within said partitions, said silicon tetra-chloride being at a pressure different from those of said substances to be separated and connecting silicon tetra-chloride with a device operated by pressure differences.

12. A method of preventing the mixing of undesired substances on the breaking down of a separating partition consisting of introducing a separating fluid neutral to the possible extent between the said substances to be separated, said separating fluid being maintained at a given temperature at a substantially constant pressure, which is different from those of the said substances, circulating said fluid constantly, heating said fluid to raise the temperature of one of said substances and connecting said fluid with an indicating device operated by pressure differences.

13. An apparatus for preventing the mixing of undesired substances on the breaking down of a separating partition including a receptacle containing one substance, a further receptacle containing a further substance to be separated from the first, a multiple walled partition separating said receptacles, a separating fluid neutral to the possible extent within said partition and at a pressure different from those of said substances, and indicating means actuated by the alteration of the condition of said separating fluid.

14. An apparatus for preventing the mixing of undesired substances on the breaking down of a separating partition including a receptacle containing one substance, a further receptacle containing a further substance to be separated from the first, a multiple walled partition separating said receptacles, a separating fluid neutral to the possible extent maintained at a given temperature as a constant pressure within said partition, the said pressure being different from those of said substances, and at least one indicating device adapted to be operated by the alteration of said pressure.

15. An apparatus for preventing the mixing of undesired substances on the breaking down of a separating partition including a receptacle containing one substance, a further receptacle containing a further substance to be separated from the first, a multiple walled partition separating said receptacles, a separating fluid neutral to the possible extent maintained at a given temperature at a constant pressure within said partition, said pressure being different from those of said substances, at least one indicating device adapted to be operated by the alteration of said pressure, a casing surrounding said receptacles, a double partition between the outer receptacle and said casing, air at constant pressure between the walls of said partition, and safety devices in connection with said compressed air and adapted to be operated on the alteration of said air pressure.

16. An apparatus for preventing the mixing of undesired substances on the breaking down of a separating partition including a receptacle containing one substance a second receptacle containing a further substance to be separated from the first substance, a multiple walled partition between said receptacles, a plurality of chambers formed between the outer walls of said partition a separating medium in each of said chambers maintained at a given temperature at a substantially constant pressure, which is different from those of the said substances, a plurality of indicating devices operated by pressure differences and connecting means between each of said chambers and a separate one of said indicating devices.

In testimony whereof I affix my signature.

JAN van der HOEVEN.